United States Patent [19]

Lefevre

[11] Patent Number: 4,977,501
[45] Date of Patent: Dec. 11, 1990

[54] FARE COLLECTION SYSTEM USING MICROWAVES

[75] Inventor: Jean Patrick Lefevre, Palaiseau, France

[73] Assignee: Societe Anonyme dite: Compagnie Generale d'Automatisme CGA-HBS, Paris, France

[21] Appl. No.: 310,267

[22] Filed: Feb. 14, 1989

[30] Foreign Application Priority Data

Feb. 22, 1988 [FR] France .................................. 88 02084

[51] Int. Cl.$^5$ .............................................. G06F 15/21
[52] U.S. Cl. ...................................... 364/401; 235/384
[58] Field of Search ....................... 235/384; 364/401; 455/2

[56] References Cited

U.S. PATENT DOCUMENTS

| | | | |
|---|---|---|---|
| 4,001,822 | 1/1977 | Sterzer | 342/44 |
| 4,303,904 | 12/1981 | Chasek | 235/384 |
| 4,501,958 | 2/1985 | Glize et al. | 235/384 |
| 4,555,618 | 11/1985 | Riskin | 235/384 |
| 4,674,618 | 6/1987 | Eglise et al. | 235/381 |

FOREIGN PATENT DOCUMENTS

| | | |
|---|---|---|
| 0057602 | 8/1982 | European Pat. Off. . |
| 0061373 | 9/1982 | European Pat. Off. . |
| 0198642 | 10/1986 | European Pat. Off. . |
| 0222369 | 12/1983 | Japan .................................. 235/384 |
| 2142178 | 1/1985 | United Kingdom . |
| 2191029 | 12/1987 | United Kingdom . |

OTHER PUBLICATIONS

Mikuni, *Patent Abstracts of Japan*, vol. 10, No. 341, Abstract No. 61-143869; 7-1986.
Kushima, *Patent Abstracts of Japan*, vol. 11, No. 189, Abstract No. 62-14284, 1-1987.
*Patent Abstracts of Japan*, vol. 7, No. 67 (P-184), 19 Mars 1983; Abstract No. 57-211679.

*Primary Examiner*—Jerry Smith
*Assistant Examiner*—David Huntley
*Attorney, Agent, or Firm*—Sughrue, Mion, Zinn, Macpeak & Seas

[57] ABSTRACT

A payment system for transport vehicles includes a transmitter within each vehicle enclosure for transmitting information within the vehicle enclosure indicating a fare to be charged between successive vehicle stops as well as the location of the next vehicle stop. A ticket for each user includes a data processing unit, including a memory, and transceiver circuitry. Transceiver circuitry on the vehicle at a passenger boarding point interrogates the ticket to ensure a credit balance while also causing the ticket to store the location of the point of entry. Between successive stops, the transmitter equipment within the vehicle enclosure transmits signals indicating the fare to be charged for travel between successive stops, as well as the location of the next vehicle stop. The data processing unit on the ticket stores the location of the next vehicle stop while also decrementing the credit balance maintained in memory.

7 Claims, 2 Drawing Sheets

FARE COLLECTION SYSTEM USING MICROWAVES

The present invention relates to a payment system for the users of transport means.

BACKGROUND OF THE INVENTION

Systems using debit cards are known. For example, it is known to use magnetic cards having data transfer means in the form of magnetic tracks which are passed beneath read/write heads in a fixed station, or memory cards in which the transfer means are electrical contacts which make connection by means of pressure applied in the read heads of fixed processing stations.

These cards need to be inserted into a fixed processing station in order to be connected to internal components of said fixed station by means of mechanical contacts which give rise to problems of reliability insofar as the contacts may oxidize, become dirty, or damaged.

In addition, such a system slows down a stream of users.

SUMMARY OF THE INVENTION

The object of the present invention is to mitigate these drawbacks and to provide a payment system for the users of transport means, e.g., the system comprising a ticket for each user, and including the improvement whereby each transport cell, i.e., vehicle enclosure includes a transmitter/receiver equipment, a microcomputer, and a boarding terminal including transmitter/receiver means located on the user boarding passage, the microcomputer being connected to said transmitter/receiver equipment and to said boarding terminal, and said ticket containing a data processing member including a memory and transmitter/receiver means, with information being interchanged between the ticket and both the transmitter/receiver equipment and the boarding terminal by means of radio transmission.

Advantageously, said transmission is performed at microwave frequencies.

BRIEF DESCRIPTION OF THE DRAWINGS

An embodiment of the invention is described by way of example with reference to the accompanying drawings, in which.

MORE DETAILED DESCRIPTION

Figure 1:
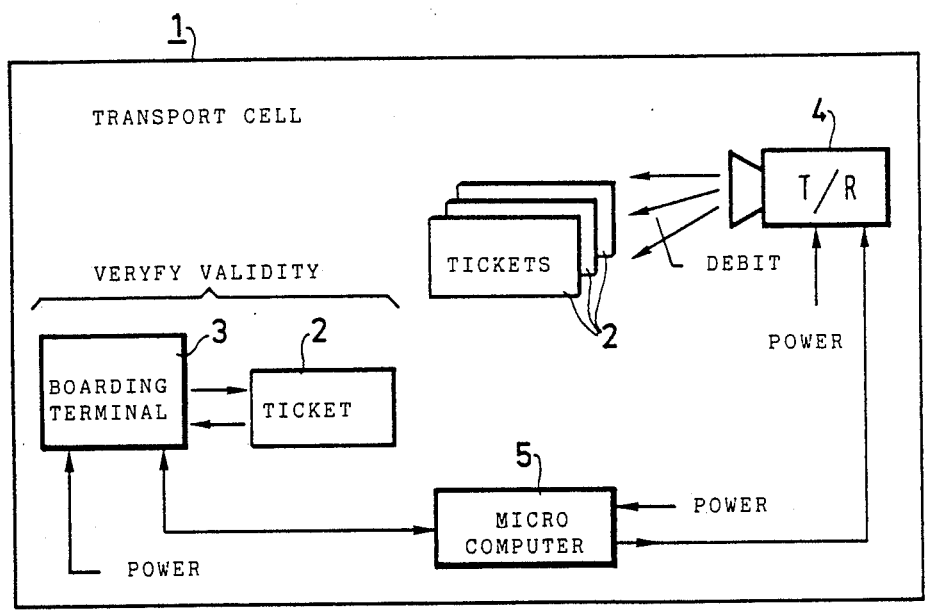
FIG. 1 is a block diagram showing a transport cell.

With reference to FIG. 1, a rectangle 1 represents a transport cell, i.e., transport vehicle enclosure such as the interior of a bus. Each user has a ticket 2 obtained at a ticket-issuing office where the ticket is credited with a certain number of transport units on payment of a corresponding sum.

The transport cell is fitted with a boarding terminal 3, a transmitter/receiver equipment 4, and a microcomputer 5.

Information is interchanged between the tickets 2 and the boarding terminal 3, and between the tickets 2 and the transmitter/receiver equipment 4 by radio transmission without any physical connection.

The transmission takes place at microwave frequencies, which makes it possible to consider the ticket 2 not as a transmitter/receiver but rather as a transponder making use of the energy transmitted by the transmitter/receiver 6 (FIG. 3) of the boarding terminal 3 in order to respond to an interrogation.

Figure 2:
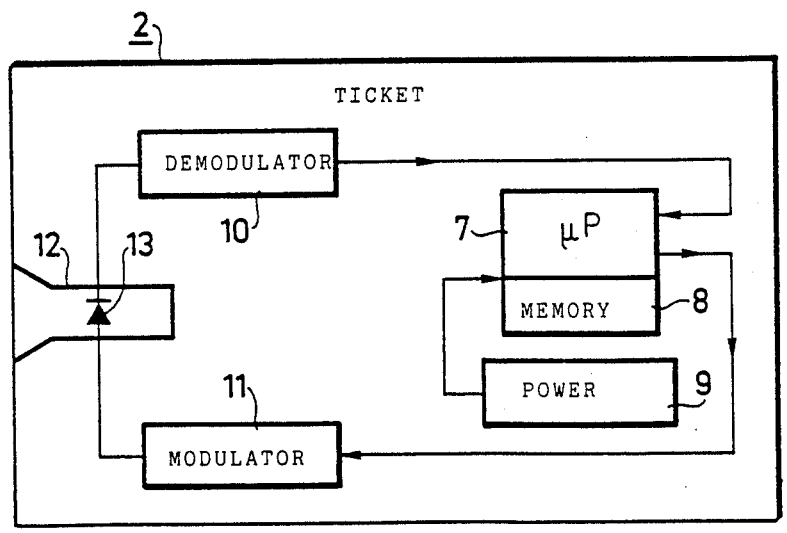
FIG. 2 is a diagram of a ticket.

The ticket 2 shown diagrammatically in FIG. 2 is constituted, for example, by a card having the same format as a bank card, but it is thicker. It contains a data processing member 7, including a memory 8, and a power supply 9 constituted, for example, by a lithium battery. It also contains a demodulator 10, a modulator 11, a receiver horn 12, and detector means 13 essentially constituted by a diode taking account of the modulation of the transmitted signal, with the carrier frequency, e.g. 9.9 GHz, being tuned with the horn.

Figure 3:
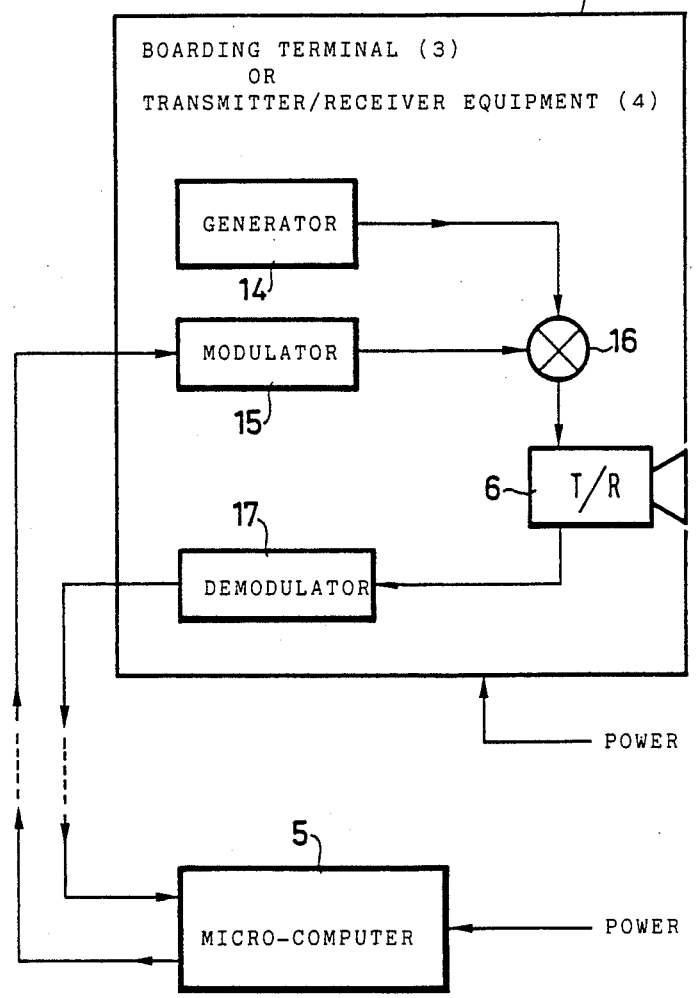
FIG. 3 is a diagram of a boarding terminal or of transmitter/receiver equipment.

The boarding terminal 3 shown diagrammatically in FIG. 3 comprises a microwave generator 14, e.g. operating at 9.9 GHz, a modulator 15, and a summing member 16 receiving output signals both from the modulator and from the generator. The output of the summing member 16 is connected to the input of the transmitter/receiver 6 whose output is connected to a demodulator 17. The modulator 15 and the demodulator 17 are connected to the microcomputer 5 of the transport cell 1. The transmitter/receiver 6 is a low power device; its power is about 10 mW and its range is limited to 1 meter (m). This boarding terminal 3 provides two-way dialog in alternation with the ticket 2 carried by a user when the user enters the transport cell 1.

The transmitter/receiver equipment 4 is constituted identically to the boarding terminal 3 and is therefore also represented by FIG. 3. However, in this case the transmitter/receiver 6 is a high power apparatus, e.g. having a power of about 200 mW and a range of about 20 m, thereby enabling it to communicate with all of the tickets 2 present within the vehicle enclosure 1. As for the boarding terminal, the modulator 15 and the demodulator 17 of the transmitter/receiver equipment 4 are connected to the microcomputer 5. The function of this transmitter/receiver equipment 4 is to automatically and simultaneously debit a given number of transport units from all of the tickets present in the vehicle between two stops, and also to transmit data identifying the exit point of the next stop, which data may be dated. These actions are performed by microwave transmission. In addition to this basic function, the equipment 4 sets up a two-way link with stationary equipment on the ground (not shown) in order to communicate with a computer network of the transport authority or to exchange local information, e.g. to specify interstop position or interzone position.

The microcomputer 5 of the transport cell 1 generates and controls the messages interchanged between the tickets 2 and the boarding terminal 3 and the equipment 4.

The boarding terminal 3, the transmitter/receiver equipment 4, and the microcomputer 5 all have primary power supplies taken from the power supply available on-board the transport cell 1.

When a user appears at the boarding to a transport vehicle, the user's ticket is activated as the user passes the boarding terminal 3 and, in response thereto, the ticket transmits the dated boarding point and the dated exit point of its previous journey, together with the number of transport units remaining. So long as this number is positive, travel is authorized and a new dated boarding point is recorded in the memory of the ticket.

During the journey, between two stops, the microcomputer 5 instructs the equipment 4 to send a signal corresponding to the exit point of the next stop and this is recorded in the memory of all of the tickets, the equipment 4 also transmits a signal corresponding to the number of transport units applicable to the current section. The tickets then subtract said number of units corresponding to said section from the number of transport units credited in each ticket.

Naturally, in order to avoid fraud, the boarding terminal 3 is associated with a passage detector of any known type coupled to said terminal so as to emit an audible or other signal if said terminal receives no response after a predetermined length of time has elapsed after a passage detection signal has been emitted.

I claim:

1. A payment system for the users of transport means for transporting passengers, said transport means having at least one transport cell for carrying at least one passenger, said transport cell having a user boarding passage through which a user passes during boarding, the system comprising a ticket for each user, and including the improvement wherein each transport cell includes transmitter equipment, a microcomputer, and a boarding terminal including transmitter/receiver means for transmitting and receiving signals, said transmitter/receiver means being located on the user boarding passage, the microcomputer being connected to said transmitter equipment and to said boarding terminal, and said ticket containing a data processing member including a memory and ticket transmitter/receiver means for transmitting and receiving signals, said system further including means for interchanging information between the ticket and both the transmitter equipment and the boarding terminal by means of electromagnetic signals.

2. A payment system according to claim 1, wherein said electromagnetic signals are at microwave frequencies.

3. A system according to claim 1, wherein said transmitter equipment included in each transport cell further includes receiving means for receiving signals.

4. A method of using a payment system for the users of transport means for transporting passengers, said transport means comprising a transport vehicle having at least one transport cell for carrying at least one passenger, said transport cell having a user boarding passage through which a user passes during boarding, transmitter equipment, a boarding terminal including transmitter/receiver means located on the user boarding passage for transmitting and receiving the signals, and a microcomputer connected to said transmitter equipment and to said boarding terminal, said payment system further comprising a ticket containing a data processing member including a memory and ticket transmitter/receiver means for transmitting and receiving signals, with information being interchanged between the ticket and both the transmitter equipment and the boarding terminal by means of electromagnetic signals, said method comprising the steps off:

activating said ticket by said boarding terminal when a user boards said transport vehicle to transmit information from said ticket to said boarding terminal relating to a remaining credit on said ticket in transport units, together with the date, boarding point and exit point of the ticket's previous journey, and during a journey between two stops, transmitting from said transmitter equipment a debit signal concerning a given number of transport units, which number is debited from the credit of each ticket in the vehicle, said transmitter equipment also emitting a signal corresponding to the next stop point, which information is written in the memory of each of the tickets.

5. A payment system for the users of transport means for transporting passengers between vehicle stops, said transport means comprising a vehicle having at least one transport cell for carrying at least one passenger, said transport cell having a user boarding passage through which a user passes during boarding, the system comprising:

transmitter means within each transport cell and movable with the vehicle between successive vehicle stops, for automatically transmitting a debit signal between successive vehicle stops; and a ticket for each user, each said ticket including memory means for storing a credit balance and means responsive to said debit signal for simultaneously decreasing said credit balance of each of said tickets carried by users in said transport cell.

6. A system according to claim 5, further comprising boarding terminal means located on said vehicle at said user boarding passage for transmitting to said ticket an entry signal indicating the location of said vehicle at the time of entry by said user.

7. A system according to claim 5, wherein said transmitted means also transmits an exit signal indicating the location of a next stop of said vehicle, and wherein each said ticket includes means responsive to said exit signal for storing the location of said next stop.

* * * * *